(12) United States Patent
Krause et al.

(10) Patent No.: US 8,261,944 B2
(45) Date of Patent: Sep. 11, 2012

(54) BABY FORMULA DISPENSER FOR FILLING BABY BOTTLES

(76) Inventors: Falon Julie Krause, Manassas, VA (US); Alan Delor Krause, Manassas, VA (US)

(*) Notice: Subject to any disclaimer, the term of this patent is extended or adjusted under 35 U.S.C. 154(b) by 362 days.

(21) Appl. No.: 12/767,656

(22) Filed: Apr. 26, 2010

(65) Prior Publication Data
US 2010/0320233 A1 Dec. 23, 2010

Related U.S. Application Data

(60) Provisional application No. 61/225,719, filed on Jul. 15, 2009, provisional application No. 61/218,564, filed on Jun. 19, 2009.

(51) Int. Cl.
*B67D 7/74* (2010.01)
(52) U.S. Cl. ............... 222/129.3; 222/146.2; 99/279
(58) Field of Classification Search ............ 222/129, 222/129.1–129.4, 135, 146.1, 146.2, 145.1, 222/145.4, 145.5, 145.6; 99/279–282
See application file for complete search history.

(56) References Cited

U.S. PATENT DOCUMENTS

| | | | |
|---|---|---|---|
| 3,352,460 A | 11/1967 | Herring | |
| 4,059,181 A * | 11/1977 | Greenfield et al. | 194/242 |
| 5,397,031 A | 3/1995 | Jensen | |
| 5,570,816 A | 11/1996 | LaBarbera, Jr. | |
| 5,671,325 A | 9/1997 | Roberson | |
| 5,797,313 A | 8/1998 | Rothley | |
| 6,411,777 B2 | 6/2002 | Roberson | |
| 6,412,527 B1 | 7/2002 | Brice | |
| 6,711,990 B1 | 3/2004 | Harrison | |
| 6,766,106 B2 | 7/2004 | Roberson | |
| 6,829,431 B1 | 12/2004 | Haven et al. | |
| 6,951,166 B1 | 10/2005 | Sickels | |
| 7,104,184 B2 | 9/2006 | Biderman et al. | |
| D534,028 S | 12/2006 | Artis | |
| D544,287 S | 6/2007 | Joss et al. | |
| 7,316,249 B2 * | 1/2008 | Cheong | 141/100 |
| 8,127,662 B2 * | 3/2012 | Nijboer et al. | 99/275 |
| 8,167,006 B1 * | 5/2012 | Mathis et al. | 141/247 |
| 2005/0230343 A1 * | 10/2005 | Huber | 215/387 |
| 2006/0150821 A1 * | 7/2006 | Paul et al. | 99/279 |
| 2006/0157463 A1 * | 7/2006 | Wiele et al. | 219/214 |
| 2008/0110935 A1 * | 5/2008 | Huber et al. | 222/221 |
| 2009/0151574 A1 * | 6/2009 | Nijboer et al. | 99/282 |
| 2010/0112152 A1 * | 5/2010 | Sinnema et al. | 426/248 |
| 2010/0133222 A1 * | 6/2010 | Mathieu | 215/11.3 |
| 2011/0163127 A1 * | 7/2011 | DiBella-Lenaway | 222/145.6 |

* cited by examiner

*Primary Examiner* — Lien Ngo
(74) *Attorney, Agent, or Firm* — Christopher Wood; Premier Law Group, PLLC

(57) ABSTRACT

A dispenser for separately dispensing warmed water and powdered baby formula, to promote expeditious preparation of baby bottles. The dispenser may have a water circuit including a threaded water storage vessel, a threaded in-line filter, an electrically powered, thermostatically controlled heating chamber, and a discharge conduit controlled by a lever. The dispenser may have a powder circuit comprising a powder storage chamber, a rotary compartmented carousel which promotes flow of stored powder for discharge through a chute, and an agitator to further promote flow of powder. An illumination lamp may be disposed to illuminate discharge areas. A catch tray may be disposed beneath the liquid and powder discharge areas.

8 Claims, 12 Drawing Sheets

| TABLE | |
|---|---|
| Part # | |
| 100 | dispensing appliance |
| 120 | housing |
| 140 | first dispensing station |
| 160 | lever |
| 180 | second dispensing station |
| 200 | water handling chamber |
| 220 | closure |
| 240 | water bottle |
| 260 | threaded neck |
| 280 | tab |
| 300 | powder storage chamber |
| 303 | optional sloping side 303 inside chamber 300 |
| 320 | closure |
| 340 | agitator |
| 360 | lamp |
| 380 | overhang portion |
| 400 | removable tray |
| 420 | extended base portion of housing 120 |
| 440 | threaded receptacle |
| 460 | conduit |
| 480 | fitting |
| 500 | water filter |
| 520 | conduit |
| 540 | water storage chamber |
| 580 | thermostat |
| 585 | temperature indicator |
| 600 | heating element |
| 620 | conduit |
| 640 | lever operated valve |
| 660 | rotary carousel |

Fig. 7A

| TABLE (continued) ||
|---|---|
| Part # | |
| 662 | power supply |
| 664 | switch |
| 666 | controller |
| 666cr | integrated Controller and regulator |
| 668 | regulator |
| 680 | powder discharge chute |
| 700 | pushbutton |
| 720 | motor |
| 740 | bottom wall |
| 760 | opening |
| 780A | compartment |
| 780B | compartment |
| 780C | compartment |
| 800 | opening |
| 820 | pusher |
| 840 | hinge rod |
| 860 | spring |
| 880 | bottom surface |
| 900 | additional accessories |
| 920 | lamp controller |
| 940 | plug and cord assembly |

*Fig. 7B*

BABY FORMULA DISPENSER FOR FILLING BABY BOTTLES

CROSS-REFERENCE TO RELATED APPLICATIONS

This application claims the benefit of priority from U.S. Provisional Patent Application Ser. Nos. 61/225,719 (filed Jul. 15, 2009) and 61/218,564 (filed Jun. 19, 2009). The entire contents of 61/225,719 (filed Jul. 15, 2009), and 61/218,564 (filed Jun. 19, 2009) are herein incorporated by reference in their entirety.

STATEMENT REGARDING FEDERALLY SPONSORED RESEARCH OR DEVELOPMENT

Not Applicable.

FIELD OF THE INVENTION

The present invention relates to appliances for dispensing baby formula for feeding babies.

BACKGROUND OF THE INVENTION

Babies may feel hungry and demand to be fed at any time. This often occurs at times which are inconvenient for parents and other caregivers, such as during the night. At night, the caregiver may herself or himself be awakened and thus not be fully alert and functioning. In a crowded household, many people will be inconvenienced should the baby start to cry if not fed immediately. It therefore is highly desirable to provide the baby with a bottle filled with milk or a synthetic substitute such as prepared food known as baby formula.

Baby formula is a prepared product conventionally provided in dry granular form. Baby formula is intended to be mixed with water to generate a solution or emulsion which is suitable for babies to draw from a baby bottle.

Ordinarily, preparation of a baby bottle can be time consuming. Even when a supply of clean bottles is maintained and available, there remains the task of mixing the baby formula with water and heating the mixture to a suitable temperature, such as body temperature. Again recalling that this situation is especially apt to occur at night, when the caregiver's readiness is at a minimum, it becomes highly desirable to expedite and simplify the task of preparing a bottle of formula for the baby.

SUMMARY OF THE INVENTION

An appliance which expedites preparation of a baby bottle. The appliance maintains a supply of water at suitably elevated temperature and a supply of metered baby formula. The water and baby formula are separately dispensed from the appliance into an empty bottle. It should be understood that the terms "baby formula" and "powdered baby formula" are hereinafter regarded as equivalent terms.

Warmed water is dispensed at a first dispensing station, and dry, granular baby formula is dispensed at a second dispensing station. When both ingredients have been dispensed into a baby bottle, they may be mixed in the baby bottle. The bottle may then be capped with a nipple for example and given to the baby.

The appliance is highly convenient both because it expedites the process of preparing a baby bottle, and also because its size and weight enable it to be used in domestic premises wherever a suitable flat or horizontal surface and electrical supply may be located. The flat top surface of bedroom and other furniture will satisfy the need for a flat or horizontal surface. As most dwellings are provided with electrical power receptacles, the requirement for power is easily satisfied.

The two-step process of preparing a bottle may seem subject to improvement wherein the appliance could mix the ingredients and dispense the resultant mixture. However, this seemingly preferable procedure has disadvantages that are redressed by the two-step process. One problem is that if ingredients are mixed in the appliance, subsequent cleaning is rendered more difficult in that pasty or dried residues must be dealt with. There is also no assurance that the appliance will have fully and properly mixed the dry powder with the water, so that adult attention to this aspect may still be needed. Whereas once mixed baby formula has a limited shelf-life at the end of which it must be disposed of.

In the instant invention, a powder dispenser which dispenses powdered baby formula has an agitator which promotes flow of granular material to a dispenser. The dispenser comprises a rotatable carousel having a plurality of compartments of predetermined volume for assuring appropriate metering of baby formula. A pushing device assists in propelling powdered baby formula from the compartment of the carousel.

The novel appliance is therefore particularly suited for being maintained near a sleeping baby and is readily available and operated.

BRIEF DESCRIPTION OF THE DRAWINGS

FIGS. 7A and 7B is a table of reference numerals and the subject matter of these reference numerals.

Similar reference characters denote corresponding features consistently throughout the attached drawings.

DETAILED DESCRIPTION OF THE INVENTION

Figure 1:
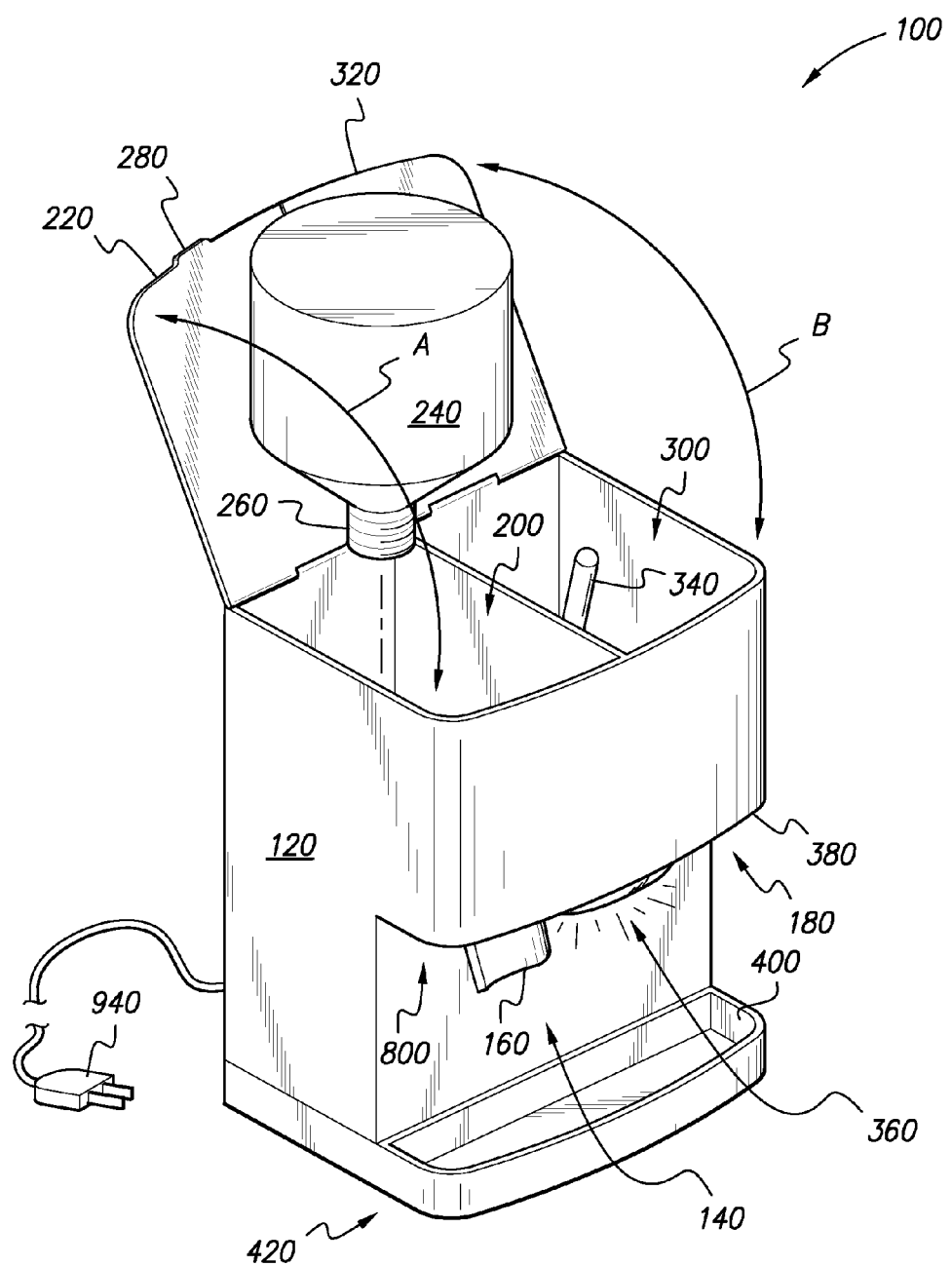
FIG. 1 is an environmental, perspective view of a dispensing appliance according to the invention.

The present invention is directed to a dispensing appliance 100 for dispensing warmed water (not shown) and powdered baby formula (not shown). More specifically, the dispensing appliance 100, as seen in FIG. 1, may be suitable for placing on an environmental surface such as the top of a table, dresser, or the like (none shown). Advantageously, the dispensing appliance 100 may be located in close proximity to where the infant or toddler sleeps so that a baby bottle (not shown) may be quickly filled with warm water and dry powdered or granular baby formula (water and baby formula not shown). Although it may be built to any dimensions, illustratively, the dispensing appliance 100 may comprise a housing 120 having overall dimensions of about fifteen inches in height and twelve inches in width and depth, when placed on an environmental surface in the upright position depicted in FIG. 1 and viewed from the front. The view from the front is that which would prevail when a person is in the process of filling a bottle using the dispensing appliance 100.

The dispensing appliance 100 may dispense warmed water from a liquid circuit and baby formula from a powder circuit, each one of these two circuits being mounted to or supported within the housing 120. A first dispensing station 140, although only partially visible in FIG. 1, is disposed to dispense warmed water through a suitable conduit (not shown) to the exterior of the housing 120. A valve 640 (see FIG. 2) may control dispensing of warmed water by a control lever 160 (shown in FIG. 1) which is disposed to control water being discharged from the first dispensing station 140 in response to being depressed from the front of the housing 120. The first dispensing station 140 may be similar to those provided in commercially available water dispensers which typically employ bottled water, and action of the control lever 160 and its associated valve may therefore be similar to control levers of known water dispensers.

The powder circuit may dispense powdered baby formula from a second dispensing station 180 located beside the first dispensing station 140. In use, a person holds a baby bottle with the open end held just below one of the dispensing stations 140 or 180, dispenses warmed water or baby formula, then moves to the other dispensing station 180 or 140 and dispenses the other ingredient. With both warmed water and baby formula contained within the bottle, these ingredients may be suitably stirred or blended. The baby bottle may then have a suitable nipple installed thereon, and is ready for feeding.

The first dispensing station 140 may be spaced apart from the second dispensing station 180 so as to avoid cross contamination for example. Nevertheless, it would also be possible to arrange abutment or close proximity of the first dispensing station 140 and the second dispensing station 180.

FIG. 1 shows how water and baby formula may be loaded into and stored for use within the housing 120. First referring to the liquid circuit, the housing 120 comprises a water handling chamber 200 having a hinged door or closure 220 which may be swung in the direction of an arrow A to reveal the interior of the water handling chamber 200. Water is preferably provided in removable vessels such as the water bottle 240, which may have a threaded neck 260 for threading to a corresponding receptacle (see FIG. 2) included with the water circuit. The closure 220 may be conveniently lifted using a tab 280.

The powder circuit (see FIG. 4) may also have a powder storage chamber 300 which is open at the top and has an openable door or closure 320 disposed selectively to seal the powder storage chamber 300 and to reveal the interior of the powder storage chamber 300. The closure 320 may be hinged and provided with a tab (not shown) to facilitate lifting in the manner of the closure 220 so that the closure 320 swings open and closed as indicated by arrow B. The end of an agitator 340 is visible in the powder storage chamber 300. The agitator 340 promotes gravity feed of powder in the powder circuit.

A lamp 360 may be mounted to the exterior of the housing 120 in a suitable location, such as beneath an overhang portion 380 of the housing 120. The lamp 360 may be of any known type and may be of limited power or brightness so as for example not to be objectionable in darkened bedrooms (not shown).

The dispensing appliance 100 may comprise a removable tray 400 disposed below at least one of and preferably below both of the first dispensing station 140 and the second dispensing station 180, for catching spillage from the water circuit, the powder circuit, or both. The tray 400 may be supported within an extended base portion 420 of the housing 120.

Figure 1A:
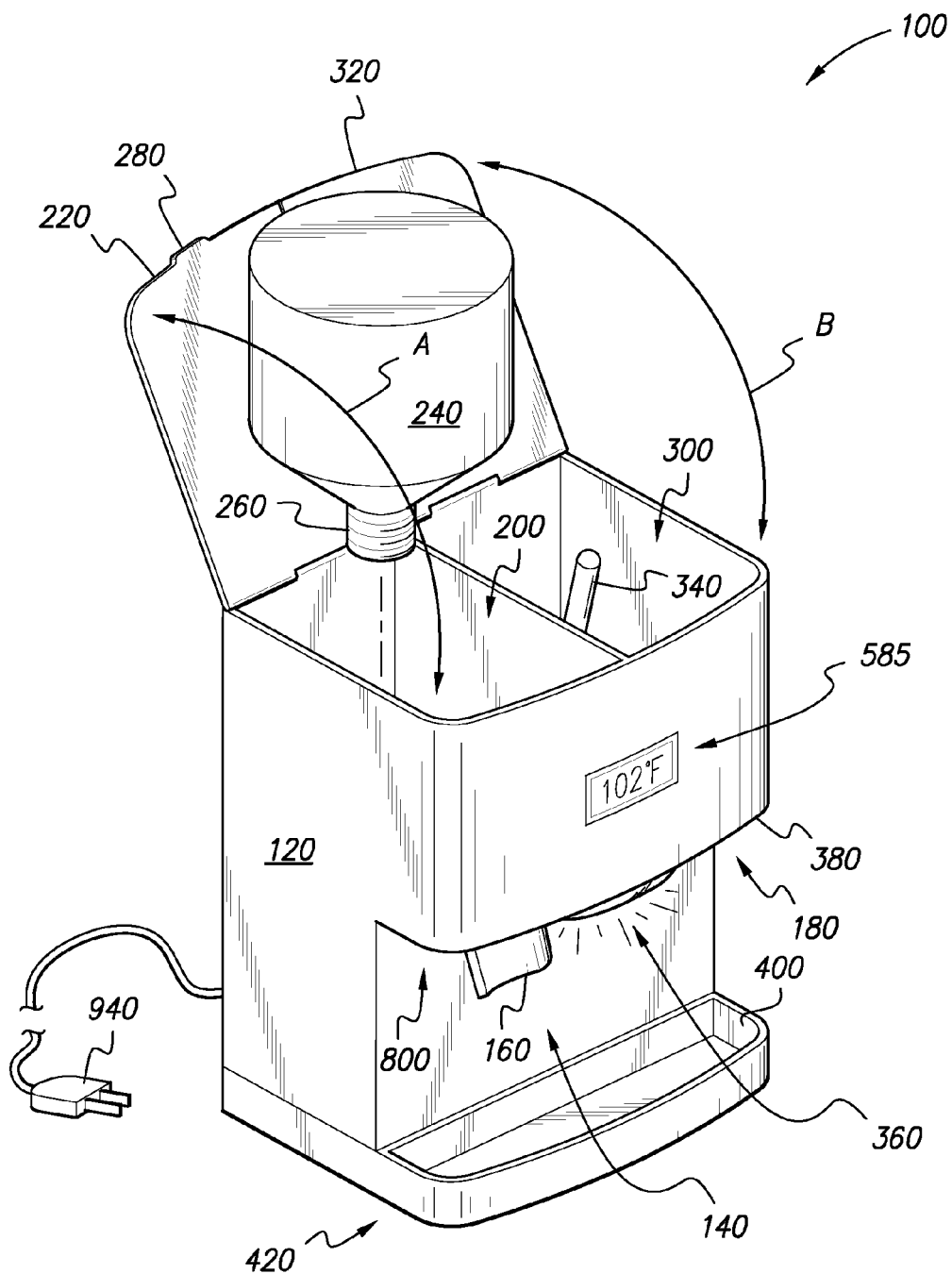
FIG. 1A is an environmental, perspective view of a dispensing appliance according to the invention.
Figure 2:
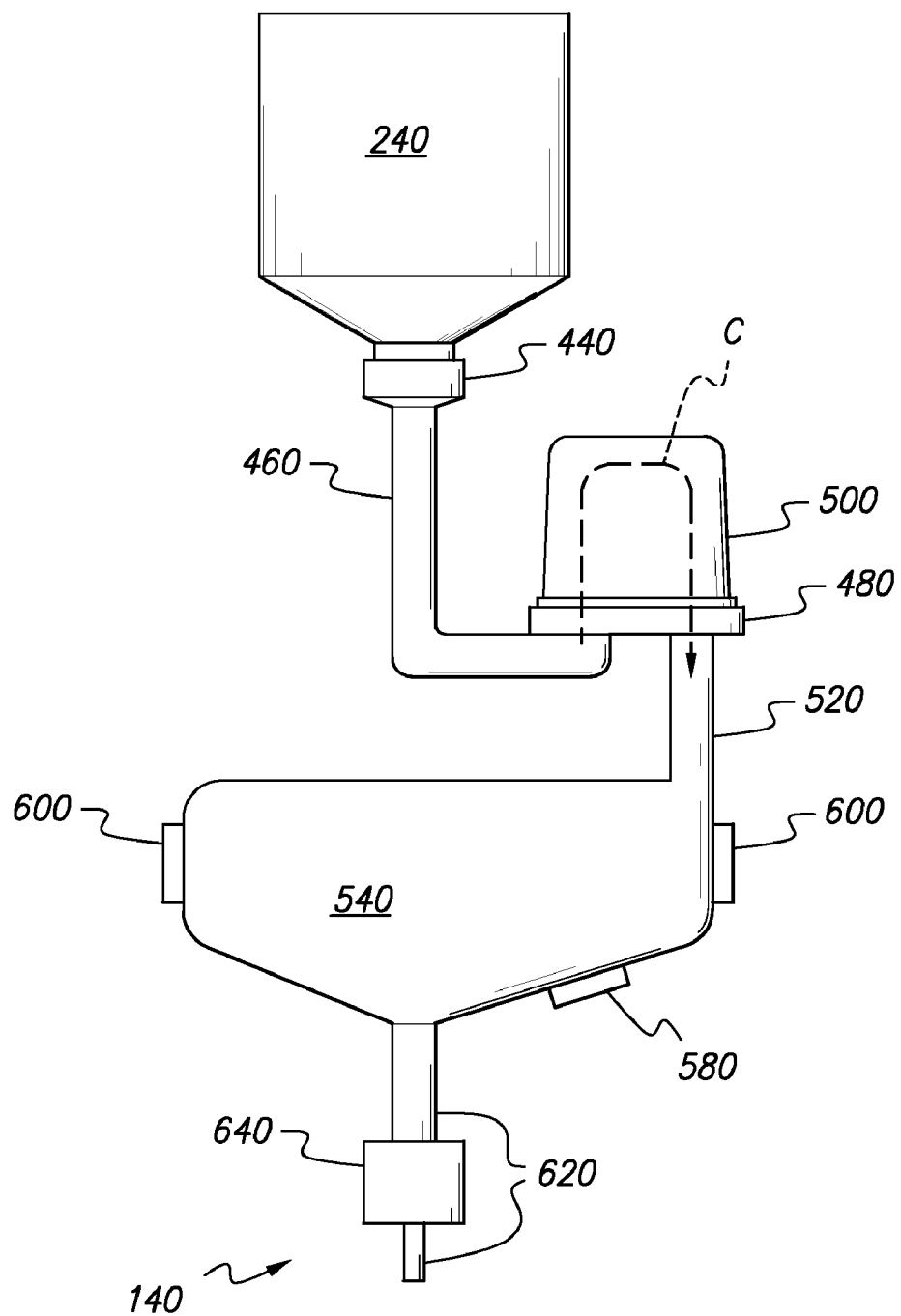
FIG. 2 is a diagrammatic side view of a water circuit which may be incorporated into the dispensing appliance of FIG. 1.

Turning now to FIG. 2, the water circuit is shown in diagrammatic fashion. A suitable water supply such as the water bottle 240 may thread to, press it to, or otherwise engage a correspondingly threaded connection having a threaded receptacle 440 for receiving the water bottle 240, which is in communication with a conduit 460. The conduit 460 may integrally incorporate the threaded connection which receives the water bottle 240. The conduit 460 may lead to a fitting 480 which serves as a base for a water filter 500. The water filter 500 may be for example of a commercially available type such as a cartridge filter which threads to or press fits to a receptacle such as the fitting 480. Water may pass serially along the water circuit, particularly through the water filter 500 in the direction indicated by dashed line and arrow C. Water then flows through a conduit 520 to a water storage chamber 540. The water storage chamber 540 both stores and maintains temperature of water to promote expeditious dispensing of pre-warmed water. To this end, an electric resistive heating element 600 may be disposed in heat exchange relation to the water storage chamber 540. A thermostat 580 may be provided in temperature sensing relation to water contained within the water storage chamber 540. The thermostat 580 may be manually adjustable. The thermostat is disposed to control electrical power supplied to the heating element 600 (see FIG. 6) which is disposed in heat transfer relation to the water storage chamber 540. Although depicted as being external to the water storage chamber 540 in FIG. 2, for example encircling the water storage chamber 540 in the manner of a belt, the heating element 600 could be located within the water storage chamber 540 so as to be immersed in water contained therein. A temperature indicator 585 (shown in FIGS. 1A and 6A) can be operatively linked to the thermostat 580. The temperature indicator 585 provides a visual display of the temperature in the water storage chamber 540. A baby caregiver, such as the baby's mother or nurse, can look at the temperature indicator 585 to discern when it is OK to operate the lever operated valve 640 to dispense heated water from water storage chamber 540.

Water contained within the water storage chamber 540 may be maintained at a suitable predetermined temperature due to the thermostat 580 and the heating element 600. The water storage chamber 540 may be temperature insulated to promote maintaining temperatures above ambient temperatures. When the control lever 160 is operated, water may be discharged from the water storage chamber 540 through a conduit 620 under the control of the lever operated valve 640. The valve 640 can be operated by lever 160 (shown in FIG. 1).

Figure 3:
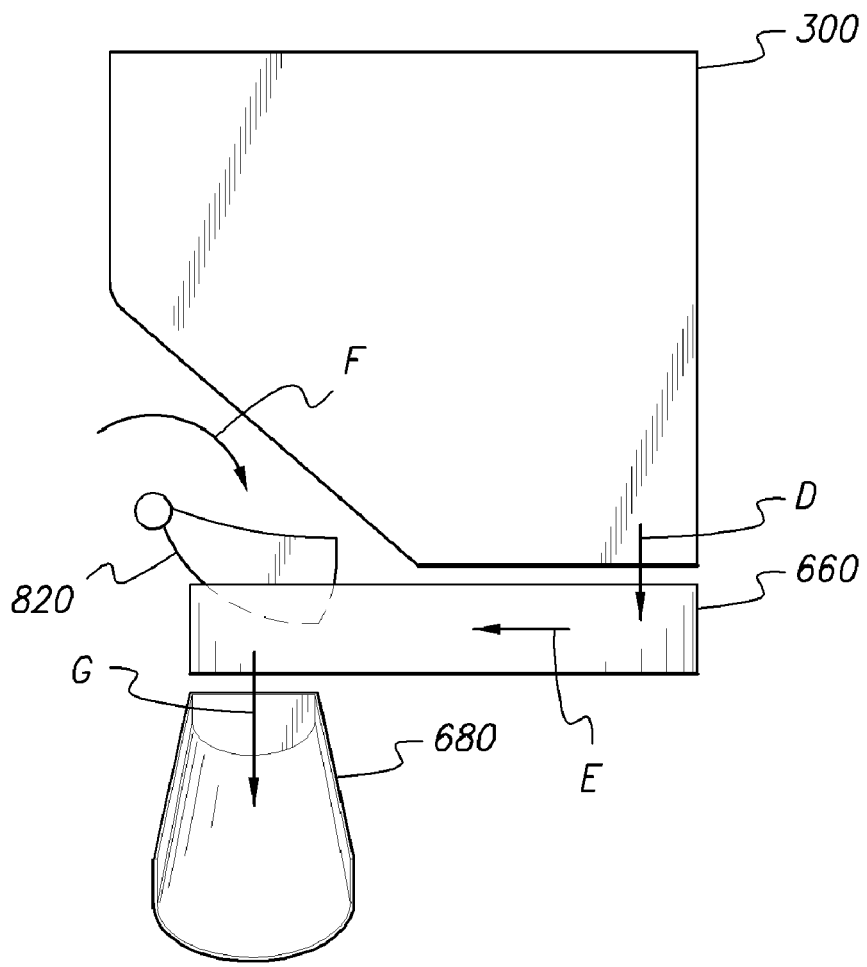
FIG. 3 is a diagrammatic side view of a powder dispensing circuit which may be incorporated into the dispensing appliance of FIG. 1.

FIG. 3 shows the basics of the powder circuit. Powdered baby formula is metered as it is dispensed from the powder storage chamber 300. This is accomplished by dispensing powdered baby formula into a rotary carousel 660, and then into a powder discharge chute 680. The terms "rotary carousel" and "carousel" are hereinafter regarded as equivalent terms.

Figure 4:
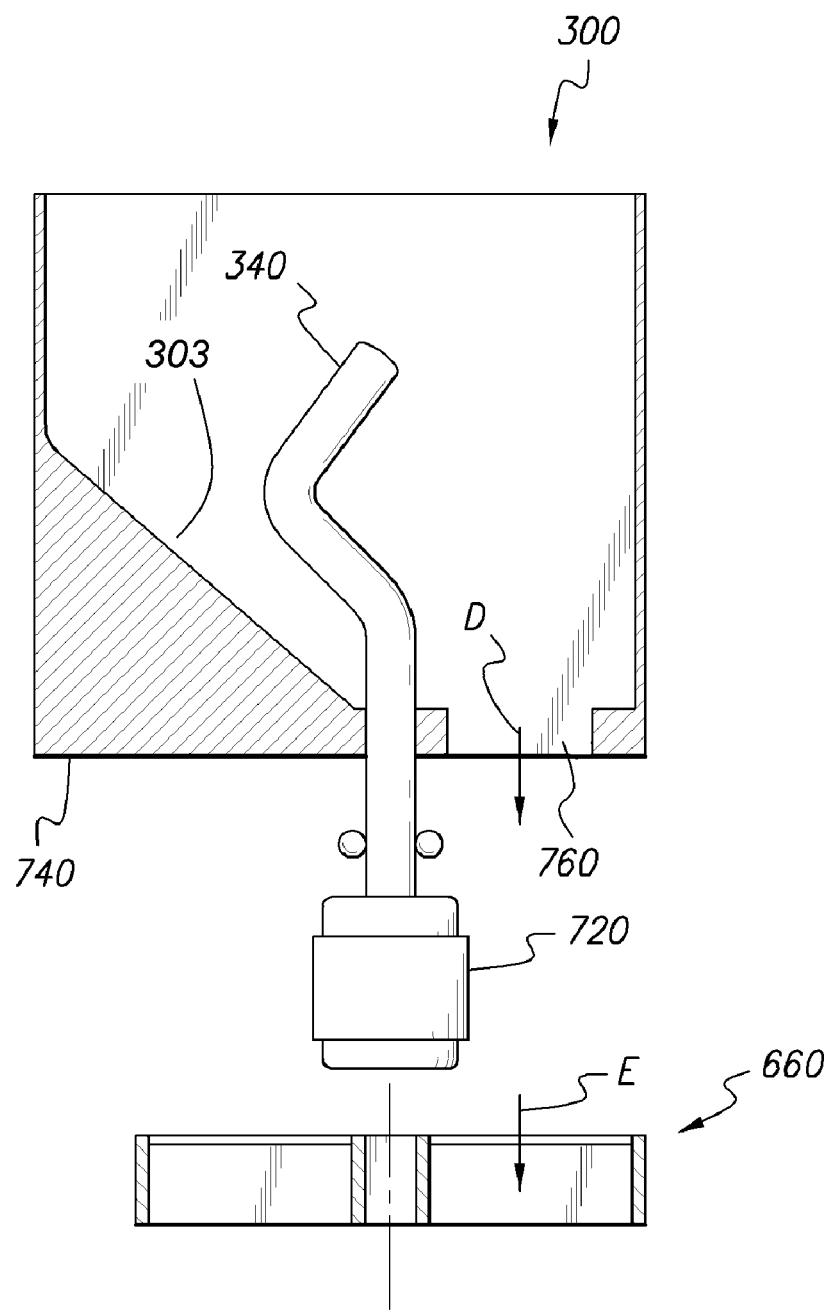
FIG. 4 is a diagrammatic side view of components of the powder dispensing circuit of FIG. 3.

Referring now to FIG. 4, powdered baby formula is initially stored in the powder storage chamber 300. When it is desired to dispense baby formula, a switch which may be for example a pushbutton 700 (see FIG. 6) activates a motor 720 which is adapted to rotate the agitator 340 and is also adapted to rotate the rotary carousel 660. The motor 720 is an electrical motor which can be driven by an electrical supply typically derived from a mains socket or from a battery installed in the dispensing appliance 100.

Figure 8:
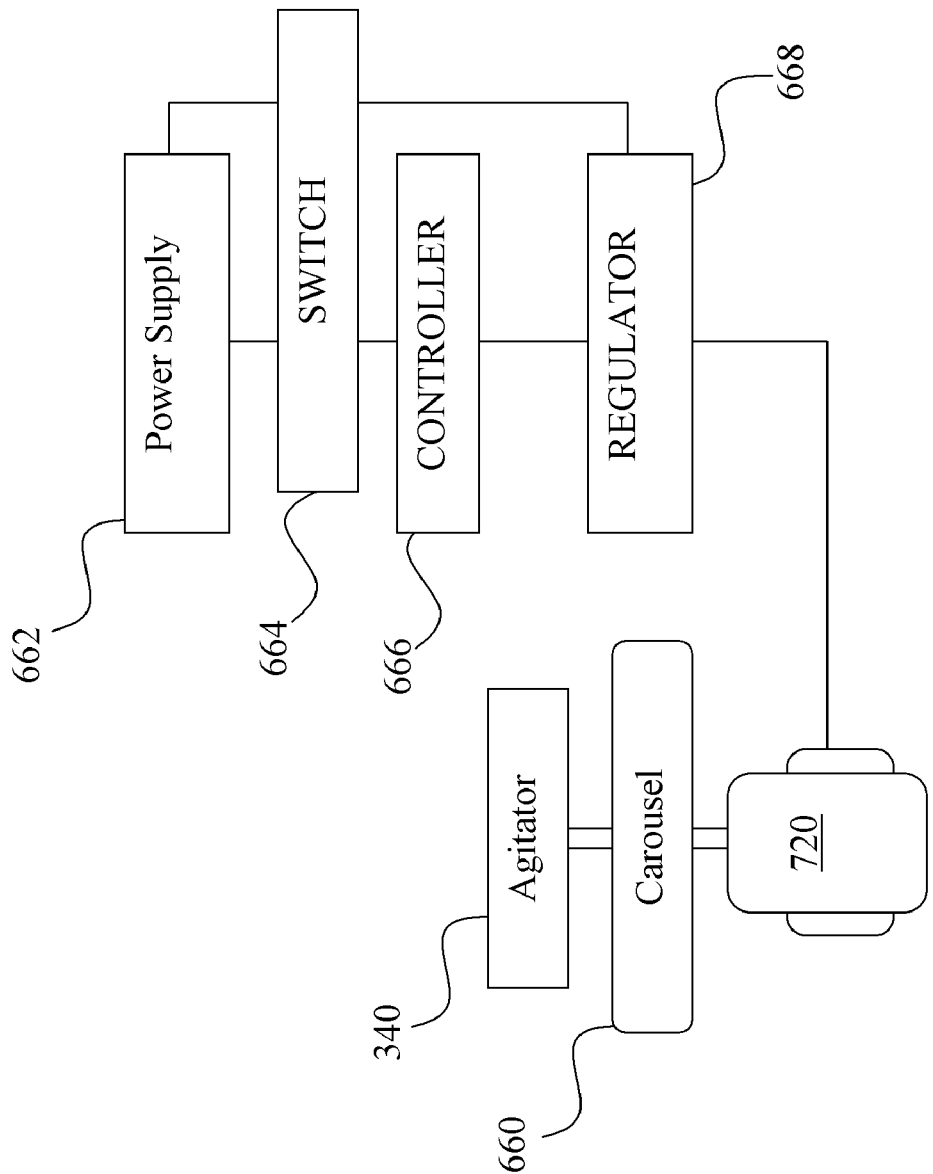
FIG. 8 shows a schematic of a control system for operating an electric motor according to the invention.
Figure 9:
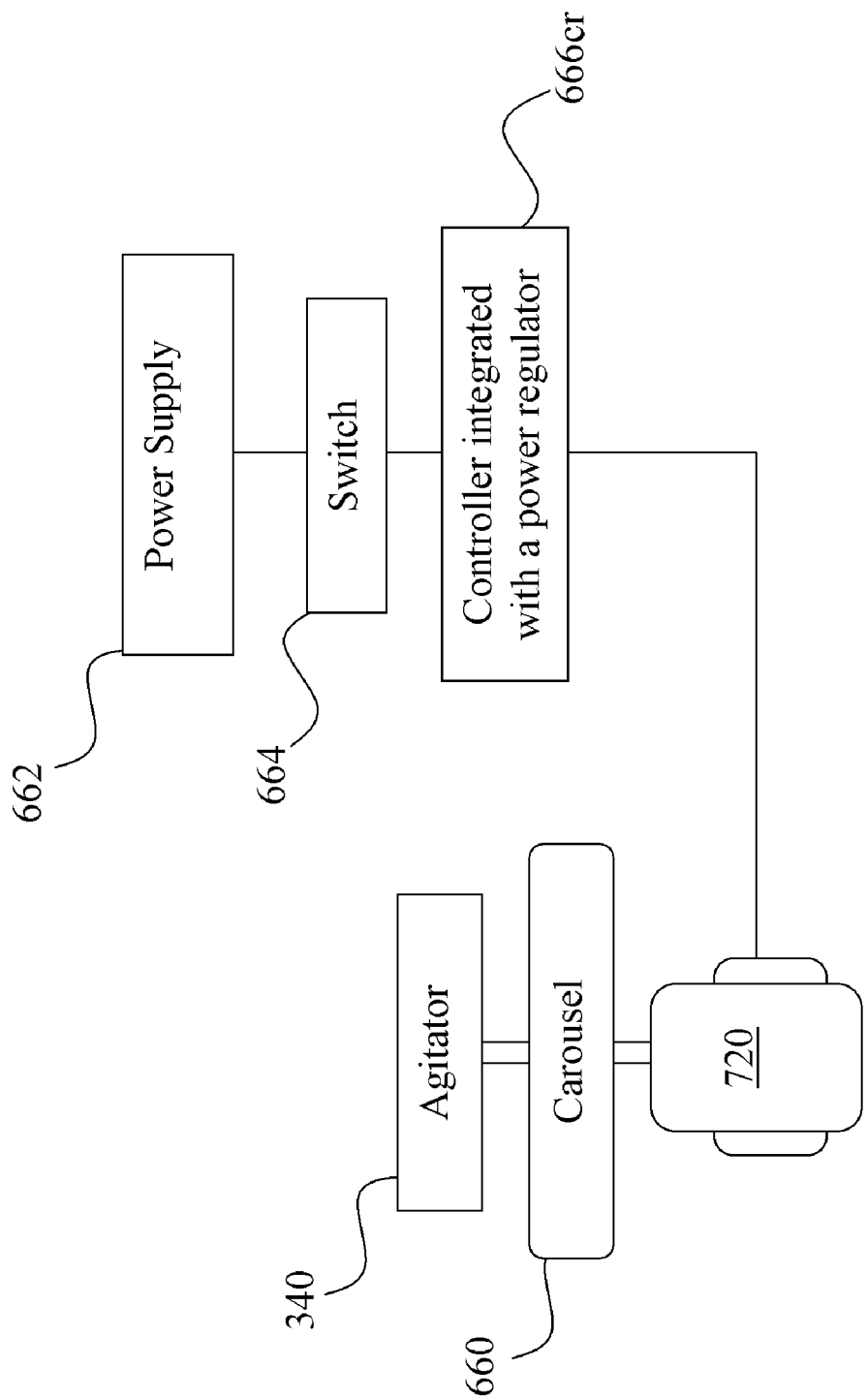
FIG. 9 shows a schematic of a control system for operating an electric motor according to the invention.

It should be kept in mind that although the rotary carousel 660 is shown spaced apart from the bottom wall 740 of the powder storage chamber 300, in a preferred embodiment these two will abut or alternatively be separated by only a small gap. Powder, once pushed into a fluent condition by rotation of the agitator 340, will flow downwardly out of an opening 760 formed in the bottom wall 740 into the rotary carousel 660. The carousel 660 is preferably located between the motor 720 and the agitator 340 as shown schematically in FIGS. 8 and 9.

Figure 5:
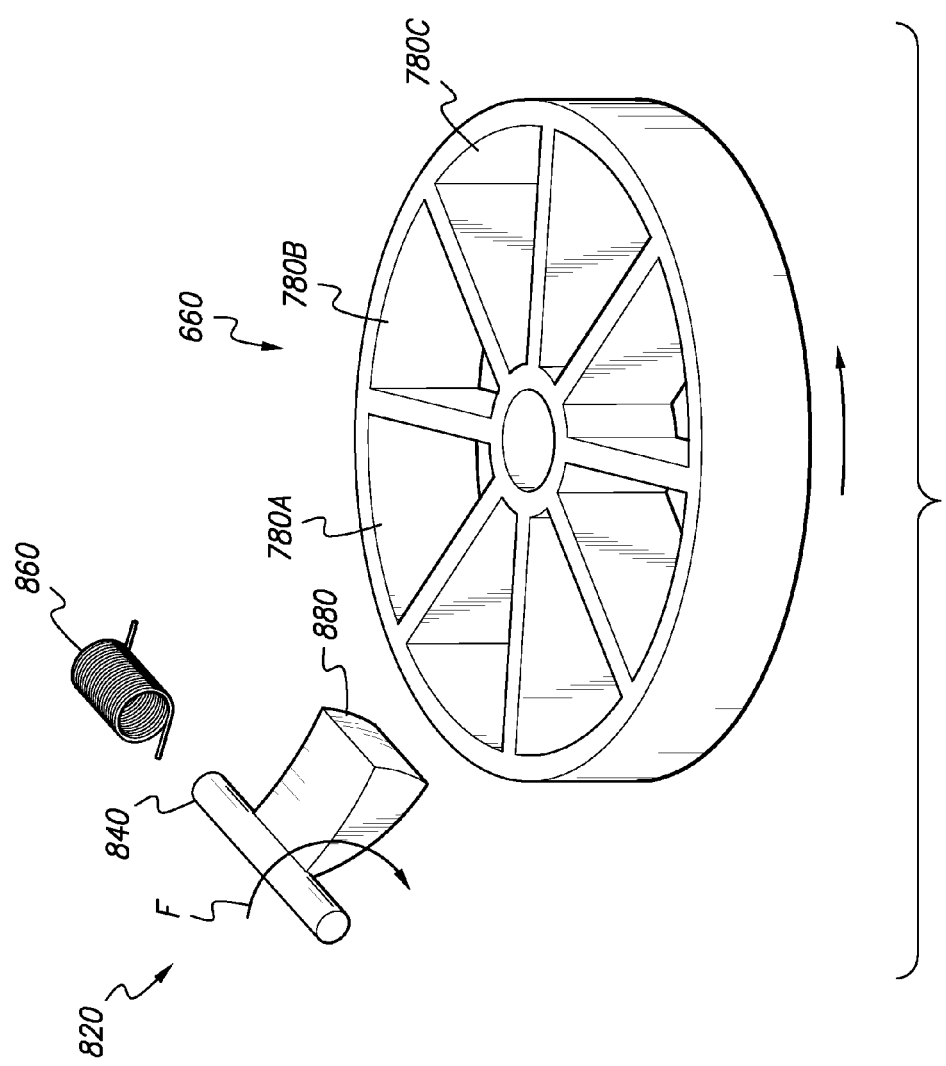
FIG. 5 is a perspective detail view of one of the components of FIG. 3 and one of the components of FIG. 4.

As seen in FIG. 5, the rotary carousel 660 may comprise a number of compartments 780A, 780B, 780C, etc. The opening 760 may be configured similarly to e.g. the compartments 780A, 780B, 780C, so that when the opening 760 overlies any one compartment (e.g. one of the compartments 780A, 780B, 780C), then that particular compartment is filled by powder which has descended through the opening 760 in the direction of arrows D and E under the influence of gravity and the action of agitator 340.

Correspondence of the opening 760 with configuration of each one of the compartments 780A, 780B, 780C, etc., acts in the capacity of a restrictor which both avoids overloading the rotary carousel 660 and also limits powder being dispensed from the rotary carousel 660 to the predetermined volume of each one of the compartments 780, 780B, 780C, etc. which is being filled to undergo eventual discharge at the second dispensing station 180.

As seen in FIG. 3, rotation of the rotary carousel 660, as indicated by arrow E will cause the filled compartment (e.g. the compartment 780A, 780B, or 780C, etc.) to overlie an opening 800 (see FIG. 1) formed in the bottom wall of the housing 120 at the overhang 380 and forming part of the second dispensing station 180. Contents of the filled compartment will be discharged into the powder discharge chute 680 (indicated by an arrow G in FIG. 3) and then into the baby bottle which is held beneath the second discharge station 180.

It should be mentioned at this point that the volume of each one of the compartments 780A, 780B, 780C, etc. may be predetermined so as to correspond to an appropriate amount of baby milk formula to generate a recommended dosage of baby milk formula for one standard baby bottle.

Referring to FIGS. 3 and 5, the dispensing appliance 100 may comprise a pusher 820 disposed to push powder from one of the compartments 780A, 780B, 780C, etc. which is aligned with the powder dispensing chute 680. The pusher 820 may comprise a hinge (represented by a hinge rod 840 in FIG. 5) and a spring 860 adapted to bias the pusher 820 downwardly (as indicated by an arrow F in FIG. 5) so as to assist in expelling powder from the rotary carousel 660. The pusher 820 may have a suitably curved bottom surface 880 to enable the pusher 820 to ascend over a wall of an approaching compartment 780A, 780B, or 780C, etc.

Figure 6:
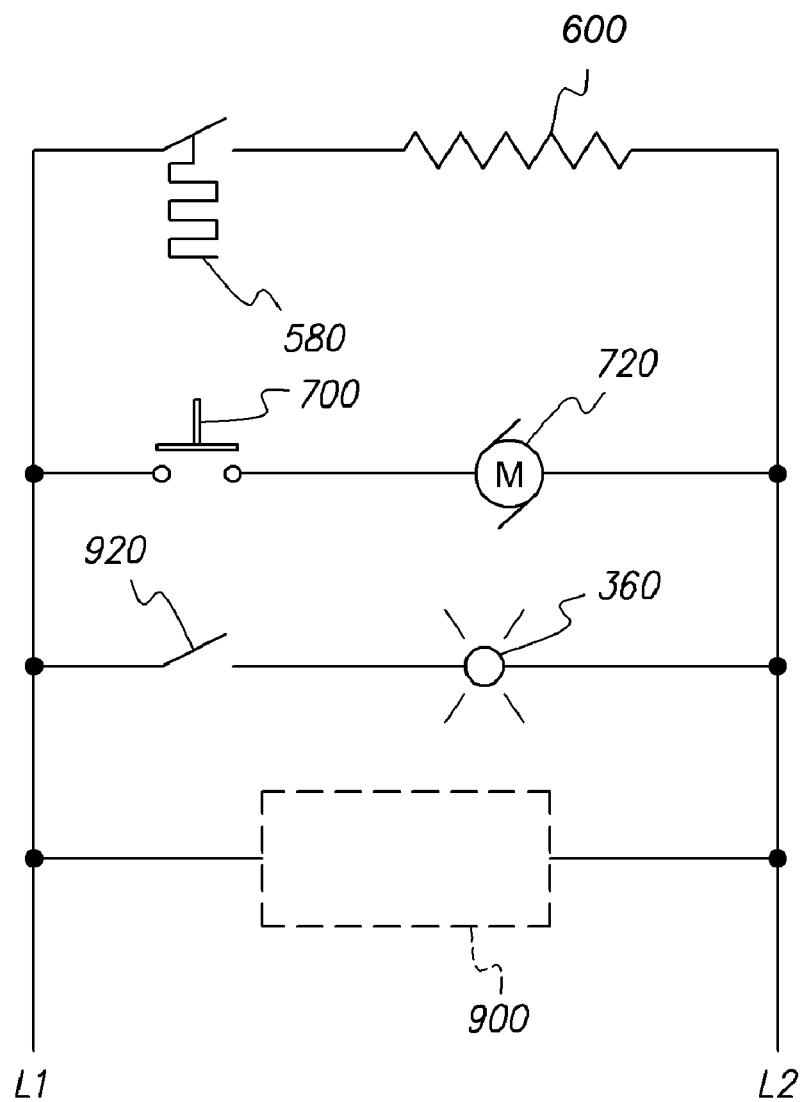
FIG. 6 is an electrical schematic of an electrical circuit which may be incorporated into the dispensing appliance of FIG. 1.
Figure 6A:
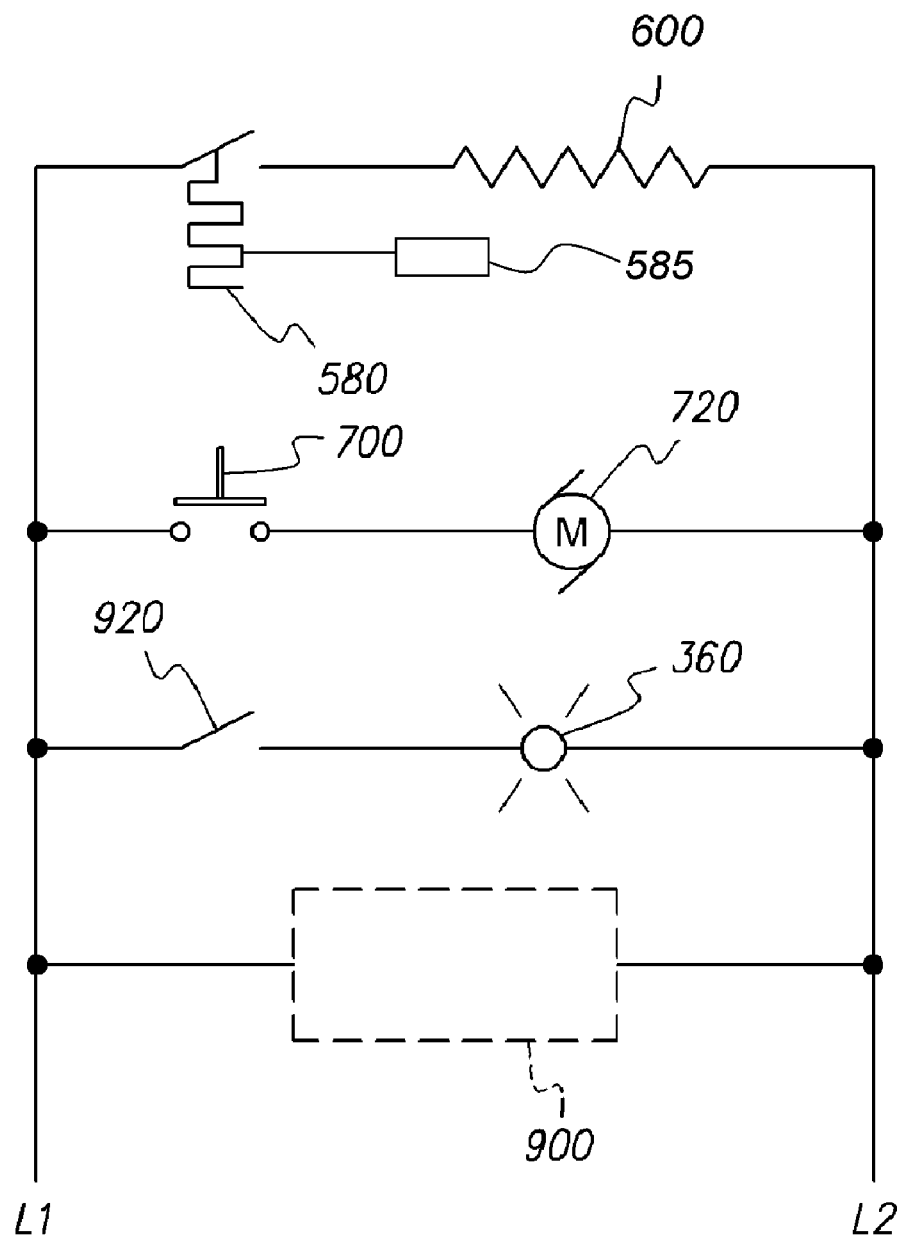
FIG. 6A is an electrical schematic of an electrical circuit according to the invention.

FIG. 6 shows an electrical circuit disposed to conduct power to electrically operated components of the dispensing appliance 100, such as the lamp 360, the heating element 600, and the electric motor 720. The circuit may also serve additional accessories 900. For example, a clock, timer, or other electrical or electronic accessory may be provided. The circuit may also comprise a lamp controller 920 which may be a manual switch, light sensor, interlock with a clock or timer, or any other desired arrangement. Power to lines L1 and L2 may be supplied by a plug and cord assembly 940 (see FIG. 1) which for example may be connected to a standard household electrical receptacle (not shown).

The motor 720 can simultaneously rotate the agitator 340 and the rotary carousel 660. The powder storage chamber 300 optionally includes an interior sloping side 303. The optional interior sloping side 303 slopes downwards and towards an opening 760 formed in the bottom wall 740. Operation of the motor 720 causes the agitator 340 to rotate and powdered baby formula is directed along the slope 303 towards and into opening 760 and thence into the rotary carousel 660.

In one embodiment, each activation of the motor 720 rotates the carousel 660 by 360°/n where n=the number of compartments 780 in carousel 660. Thus, with respect to FIG. 5 where the number of compartments in the carousel 660 is eight, the motor 720 rotates 360°/8=45° to ensure that the next compartment 780 is used in turn to dispense powdered baby formula from second dispensing station 180. In this embodiment if the last compartment 780 to deliver powdered baby formula for the previous baby feed was compartment 780C (i.e., compartment 780C was aligned with aperture 660 prior to motor 720 starting the next rotation of carousel 660 and agitator 340) then the carousel 660 would be rotated through 45° to ensure that compartment 780D is aligned with aperture 760.

In an alternative embodiment, each activation of the motor 720 rotates the carousel 660 by 360°+360°/n. Thus, with respect to FIG. 5 where the number of compartments in the carousel 660 is eight, the motor 720 is configured to rotate 360°+360°/8=360°+45°=405°. This ensures that each compartment 780 is used in turn to dispense powdered baby formula from second dispensing station 180.

In one embodiment, a controller 666 regulates the rotation of the motor 720. In a preferred embodiment, the controller 666 rotates the carousel 660 according to the following equation: by 360°/n where n=the number of compartments 780 in carousel 660.

In another embodiment the controller 666 rotates the carousel 660 according to the following equation: 360j+360/n; where j is an integer and n=a positive integer value that is equal to the number of compartments 780 in carousel 660; j can be a positive or negative integer value, wherein when j is negative the motor rotates the agitator 340 and carousel 660 in a counterclockwise direction, and when j is positive the motor rotates the agitator 340 and carousel 660 in a clockwise direction. The value of j is between −10 and +10. The value of j is preferably between −2 and +2, i.e., j can be −2, −1, 0 (zero), +1 or +2; still more preferably the value of j is preferably between −1 and +1, i.e., j can be −1, 0 (zero), +1. The value of n is between 4 and 20 (i.e., n (and therefore the number of compartments 780) can be any integer value from 4 to 20). The value of n is preferably between 6 and 12, and more preferably between 8 and 10. The value of n can be 8.

For example, when j has a value of 1 (positive integer one) and there are five compartments 780 in carousel 660 (i.e., n=5) the controller 666 rotates the carousel 660 in a clockwise direction for 360(1)+360/5=360+72=432° such that if the last compartment 780 to deliver powdered baby formula for the previous baby feed was compartment 780A (i.e., compartment 780A was aligned with aperture 660 prior to motor 720 starting the next rotation of carousel 660 and agitator 340) then the carousel 660 would be rotated through 432° to ensure that compartment 780B is aligned with aperture 760. By rotating the agitator 340 through at least 360+360/n degrees ensures that the next compartment 780 to be aligned with aperture 760 is filled to its capacity with powdered baby formula. Also, by such controlled rotation there is no need to employ a clutch and/or a de-clutch mechanism between the motor 720 and carousel 660. The greater the value of j the more times each compartment 780 passes under aperture 760 and hence the greater chance of each compartment being filled to capacity with powdered baby formula upon each dispensation of powdered baby formula from second dispensing station 180.

The controller 666 includes a processor and either includes memory or is operatively connected to sufficient memory to perform the logic steps necessary to selectively operate the motor 720. The memory may include random access memory (RAM), read only memory (ROM), erasable programmable ROM (EPROM) and/or a data storage memory. In a preferred embodiment, the ROM stores operational software code that is read and processed by the controller 666 for the operation of the motor 720. The controller 666 can be set on a predetermined cycle wherein for predetermined integer value k the motor 720 is directed by the controller 666 to rotate in a clockwise direction for k activations of the motor 720, and upon reaching, for example, k+1 activations, the controller 666 directs the motor 720 to rotate in a counterclockwise direction to facilitate suppression of any powder baby formula jams that might otherwise occur if the carousel 660 and agitator 340 are always rotated in a clockwise direction. In this embodiment the controller's instructions are directed to a regulator 668 (see FIG. 8) which serves to direct electrical power, under the control of the controller 666, to the motor 720. The regulator 668 can be integrated into the controller—see FIG. 9 where such a controller is assigned the alphanumeric label 666*cr*. The controller 666 or controller-regulator 666*cr* can, for example, direct electrical power to the motor 720 to drive the motor 720 to rotate (in degrees) the carousel 660 and agitator 340 according to the following formula: 360/n; 360+360/n; and 360j+360/n, where j is an integer and n=the number of compartments 780 in carousel 660.

It should be understood that the term "activation" as used in the Detailed Description herein refers to each time a user presses or otherwise activates the appliance device 100 by, for example, pressing pushbutton 700 (shown in FIG. 6).

FIG. 8 shows an embodiment of the present invention wherein a controller 666 is operatively connected to a power supply 662 and a regulator 668; the power supply 662 could be a household mains electricity supply or a battery installed inside the dispensing appliance 100. The controller 666 sends instructions to the regulator 668 to regulate the flow of electrical power to the electric motor 720. A switch 664 is employed to further control the supply of electrical power to the controller 666 and the motor 720 via regulator 668. It should be understood that items such as the controller 666 and regulator 668 can be integrated. FIG. 9 shows the controller integrated with the regulator (represented by alpha-numeric label 666*cr*).

The present invention may be modified from the above description if desired. For example, it would be possible to provide a rotary carousel such as the rotary carousel 660 with only one compartment such as the compartments 780A, 780B, 780C, etc. if desired. It is to be understood that the present invention is not limited to the embodiments described above, but encompasses any and all embodiments within the scope of the following claims.

What is claimed:

1. A dispensing appliance for dispensing warmed water and powdered baby formula, comprising:

a housing;

a liquid circuit mounted to said housing, comprising a water storage chamber, a heating element disposed in heat exchange relation to said water storage chamber, and a first dispensing station comprising a dispensing conduit disposed to discharge warmed water from said water storage chamber to the exterior of said housing;

a powder circuit mounted to said housing, comprising a powder storage chamber, a rotary carousel including a plurality of compartments disposed in fluid communication with said powder storage chamber, and a second dispensing station comprising a powder discharge chute disposed in fluid communication with said rotary carousel, wherein said powder discharge chute is disposed to discharge powder to the exterior of said housing at a point spaced apart from said dispensing conduit of said liquid circuit;

an electric motor disposed to rotate said rotary carousel; and an electrical circuit disposed to conduct power to said electric motor.

2. The dispensing appliance according to claim 1, further comprising an agitator disposed to rotate within said powder storage chamber and to promote flow of powder to said carousel, and a drive disposed to rotate said agitator from said electric motor.

3. The dispensing appliance according to claim 1, wherein said water circuit further comprises a water vessel having a threaded neck; and a threaded conduit for replaceably connecting said water vessel to said water circuit.

4. The dispensing appliance according to claim 1, wherein said water circuit further comprises a water filter disposed serially therein.

5. A dispensing appliance for dispensing warmed water and powdered baby formula, comprising:

a housing;

a liquid circuit mounted to said housing, comprising a water storage chamber, a heating element disposed in heat exchange relation to said water storage chamber, and a first dispensing station comprising a dispensing conduit disposed to discharge warmed water from said water storage chamber to the exterior of said housing;

a powder circuit mounted to said housing, comprising a powder storage chamber, a rotary carousel including a plurality of compartments disposed in fluid communication with said powder storage chamber, and a second dispensing station comprising a powder discharge chute disposed in fluid communication with said rotary carousel, wherein said powder discharge chute is disposed to discharge powder to the exterior of said housing at a point spaced apart from said dispensing conduit of said liquid circuit;

an electric motor disposed to rotate said rotary carousel and an agitator located in said powder storage chamber; and an electrical circuit disposed to conduct power to said electric motor, the electrical circuit comprising a controller operatively connected to a regulator, wherein said controller controls the flow of electricity to said electric motor via said regulator, wherein the controller directs the electric motor to simultaneously rotate the carousel and agitator wherein the amount of rotation of the carousel and agitator is set by the controller.

6. The dispensing appliance according to claim 5, wherein the amount of simultaneous rotation of the carousel and agitator in degrees is 360/n, where n is an integer value that equals the number of compartments in the rotary carousel.

7. The dispensing appliance according to claim 5, wherein the amount of simultaneous rotation of the carousel and agitator in degrees is 360j+360/n, where j is an integer in the range −2 to +2, and n is an integer value that equals the number of compartments in the rotary carousel.

8. A dispensing appliance for dispensing warmed water and powdered baby formula, comprising:

a housing;

a liquid circuit mounted to said housing, comprising a water storage chamber, a heating element disposed in heat exchange relation to said water storage chamber, and a first dispensing station comprising a dispensing conduit disposed to discharge warmed water from said water storage chamber to the exterior of said housing;

a powder circuit mounted to said housing, comprising a powder storage chamber, a rotary carousel including a plurality of compartments disposed in fluid communication with said powder storage chamber, and a second dispensing station comprising a powder discharge chute disposed in fluid communication with said rotary carousel, wherein said powder discharge chute is disposed to discharge powder to the exterior of said housing at a point spaced apart from said dispensing conduit of said liquid circuit;

an electric motor disposed to rotate said rotary carousel and an agitator located in said powder storage chamber; and an electrical circuit disposed to conduct power to said electric motor, the electrical circuit comprising a controller operatively connected to a regulator, wherein said controller controls the flow of electricity to said electric motor via said regulator, wherein the controller directs the electric motor to simultaneously rotate the carousel and agitator wherein the amount of rotation of the carousel and agitator is set by the controller, wherein the amount of simultaneous rotation of the carousel and agitator in degrees is $360j+360/n$, where j is an integer in the range −1 to +1, and n is an integer value that equals the number of compartments in the rotary carousel, wherein the number of compartments in the rotary carousel is in the range 4 to 20.

* * * * *